United States Patent [19]
Lee

[11] 3,911,305
[45] Oct. 7, 1975

[54] ELECTRIC MOTOR

[76] Inventor: Arthur L. Lee, 2050 Tremont, Columbus, Ohio 43231

[22] Filed: May 9, 1973

[21] Appl. No.: 358,724

[52] U.S. Cl. ................................ 310/241; 310/46
[51] Int. Cl.[2] ........................................ H02K 13/00
[58] Field of Search ........... 310/179, 184, 180, 185, 310/181, 186, 183, 40 MM, 46, 47, 91, 89, 165, 163, 239, 241, 242, 254, 258, 259; 318/521, 523, 524, 525, 527

[56] References Cited
UNITED STATES PATENTS

| | | | |
|---|---|---|---|
| 1,552,360 | 9/1925 | Travernicht | 310/241 |
| 2,027,846 | 1/1936 | Suits | 310/179 UX |
| 2,112,852 | 4/1938 | Lindell | 310/46 |
| 2,795,713 | 6/1957 | Woll | 310/254 |
| 3,135,907 | 6/1964 | Fay | 310/241 |
| 3,439,200 | 4/1969 | Saito | 310/49 |
| 3,480,813 | 11/1969 | Sillano | 310/241 |
| 3,519,858 | 7/1970 | Morganson | 310/47 |
| 3,531,709 | 9/1970 | Nazare | 310/181 |
| 3,681,550 | 8/1972 | Perry | 310/241 |

*Primary Examiner*—R. Skudy
*Attorney, Agent, or Firm*—Stanley J. Price, Jr.

[57] ABSTRACT

The motor frame has a cylindrical body portion with an annular open end portion. An internal end plate is positioned in overlying relation with the motor frame annular end portion and an armature shaft with an armature thereon is rotatably supported in the hub portion of the internal end plate. The armature has a commutator adjacent to the internal end plate. A plurality of field pole assemblies are secured to the motor housing and extend inwardly toward the armature. Each of the field pole assemblies have a pair of field pole coils wound thereon in opposite directions and the coils wound in the same direction are connected in series so that upon energization of one group of coils the armature shaft rotates in one direction and upon energization of the other group of coils the armature shaft rotates in the opposite direction. A brush support holder has a plurality of brushes supported thereon and is positioned in overlying relation with the internal end plate. The brushes supported on the brush support member extend through openings in the internal end plate into abutting relation with the commutator. The brush support ring may be removed from the motor frame to replace all of the brushes while the armature shaft is rotatably supported by the internal end plate. An indexing device is provided to position the brushes at a neutral position on the commutator. An end bell is positioned over the brush support ring and is secured to the motor frame. A brake disc may be attached to the end of the armature shaft and a disc brake secured to the motor frame.

5 Claims, 11 Drawing Figures

ELECTRIC MOTOR

BACKGROUND OF THE INVENTION

1. Field of the Invention

This invention relates to an electric motor and more particularly to a reversible direct current motor.

2. Description of the Prior Art

Direct current motors are utilized to propel haulage vehicles such as shuttle type haulage vehicles which transport mined material from a continuously advancing loading station to a fixed discharge station. The D.C. motors are required to propel the shuttle vehicle in both a forward and reverse direction. In the past, each motor required four contactors to reverse the current relation of the armature to the fields and in a six wheel shuttle car with separate motors for each wheel approximately twenty-four contactors were required for all of the motors. The contactors occupy a substantial space, approximately three times the total space required for the contactors of a two motor shuttle car. Other means of control, such as drum controllers and solenoids, have also been employed to reverse the field coils in a known manner. Reversible motors are known that include permanent magnet fields that will reverse by reversing the flow of current through the armature. The size of the permanent magnets limit the size of this type of reversible motor to fractional horsepower motors.

In D.C. motors it is customary to provide hand holes around the periphery of the motor to remove and replace the brushes. Problems are not encountered where easy access is provided for all of the brushes, i.e., including the brushes on the underside of the motor. However, for example, in mine haulage vehicles where the underside of the motor is obstructed the brushes cannot be conveniently removed without first removing the motor from the motor mount. In other arrangements where the brush holder is secured by a split nut clamp it is necessary to first remove the clamp and rotate the brush holder to gain access to the respective brushes. It is desirable to replace all of the brushes at the same time to minimize motor maintenance and, further, to minimize sparking and brush wear by positioning the brushes on a neutral position of the commutator. There is a need for a reversible D.C. motor that requires a minimum number of contactors to reverse the direction of rotation of the motor and for apparatus to quickly and rapidly remove and replace all of the brushes without completely dismantling the motor.

SUMMARY OF THE INVENTION

This invention relates to a reversible direct current electric motor that has a motor housing with an armature rotatably mounted therein. A plurality of field pole assemblies are secured to the motor housing and extend inwardly toward the armature. Each of the field pole assemblies has a first field coil wound thereon in a first direction and a second field coil wound thereon in a second direction that is opposite to the first direction. The first field coils are connected to each other in series so that upon energization of the first field coils the armature rotates in a first direction. The second field coils are also connected to each other in series so that upon energization of the second field coils the armature rotates in a second, opposite direction. With this arrangement only two contactors are required to control the direction of rotation of the reversible direct current motor.

The electric motor includes a motor frame having a body portion with an annular open end portion and a closed end portion. An internal end plate is secured to the motor frame annular open end portion and an armature shaft is rotatably supported by the internal end plate within the motor frame body portion. An armature is positioned on the shaft with a commutator portion adjacent to the internal end plate. The internal end plate has a plurality of openings therein. A brush support ring having a plurality of brush members thereon is secured to the motor frame in overlying relation to the internal end plate with the brush members extending through the openings in the internal end plate and in abutting relation with the commutator. The brush support ring with the brush members thereon is arranged to be removed from the motor frame while the armature shaft remains rotatably supported by the internal end plate. An indexing means is provided on the motor frame to position the brushes on the commutator in a neutral position. With this arrangement all of the brushes may be removed and replaced while the armature shaft is rotatably supported by the internal end plate.

A brake disc may be secured to the armature shaft and a disc brake supported from the motor frame. The disc brake includes a body portion with a depending arm on one side of the brake disc and an actuator with a depending arm portion on the other side of the brake disc. The actuator is pivotally secured to the disc brake body portion and an actuating means pivots the actuator at a location above the pivot connection for the actuator.

Accordingly, the principal object of this invention is to provide a reversible D.C. electric motor that requires a minimum member of contactors to reverse the direction of rotation of the motor.

Another object of this invention is to provide an electric motor in which all of the brushes may be simultaneously removed and replaced without dismantling the motor.

These and other objects of this invention will be more completely disclosed and described in the following specification, the accompanying drawings and the appended claims.

DESCRIPTION OF THE PREFERRED EMBODIMENTS

Figure 1:
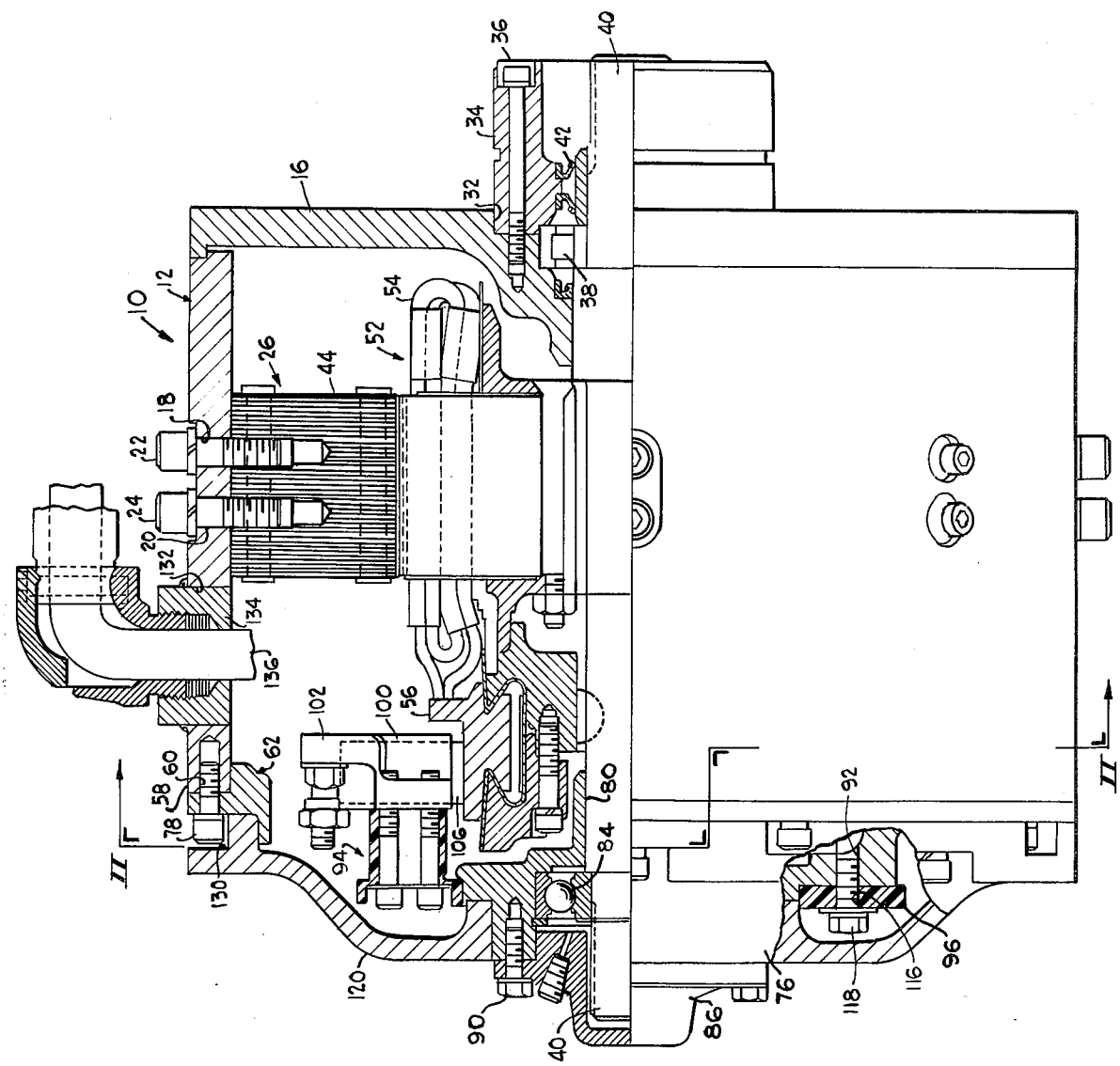
FIG. 1 is a view in side elevation and partially in section of my improved reversible electric motor, illustrating the armature support and the brush holder.

Referring to the drawings and particularly FIGS. 1, 2, 8, 9 and 10, the improved reversible D.C. motor generally designated by the numeral 10 has a motor frame or housing 12 with a cylindrical body portion 14 and an end plate 16 secured thereto adjacent the drive or output end of motor 10. The motor frame body portion 14 has a plurality of radially extending bolt receiving openings 18 and 20 through which bolts 22 and 24 extend into the motor frame 12 and secure the field pole assemblies and intercoil assemblies generally designated by the numerals 26 and 28, respectively, and illustrated in detail in FIG. 2.

The end plate 16 is secured to the end of motor frame body 14 and has an axial bore 32 therethrough. A seal carrier 34 is secured to the end plate 16 by means of bolts 36 and has a bearing 38 positioned in the bore 32 to rotatably support the output end portion of shaft 40. Suitable seals 42 are provided in the seal carrier 34.

Figure 11:
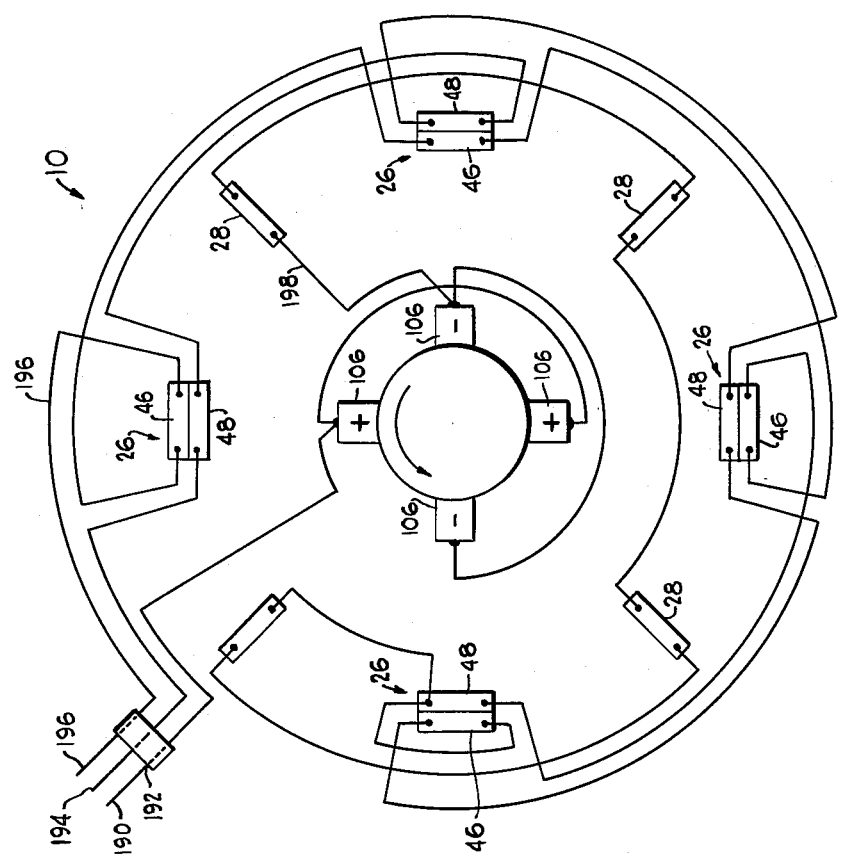
FIG. 11 is a schematic wiring diagram for the electric motor illustrated in FIG. 1.

Secured to the inner surface of the motor frame body portion and extending inwardly therefrom are four field pole assemblies generally designated by the numeral 26. Each of the assemblies 26 includes a metallic field pole 44 with dual series field coils 46 and 48 wound thereon. The field coils 46 and 48 are wound in opposite directions and are suitably connected to the source of current through three leads, as later described, to rotate the armature in opposite directions depending on what field coil is energized. As illustrated in FIG. 11, a pair of opposed assemblies 26 have the field coils 46 adjacent the motor frame body portion 14 and the other pair of opposed assemblies 26 have the field coils 48 adjacent the frame body portion 14. There are four intermediate coil assemblies 28 which have a pole piece 49 with a coil 50 wound thereon. The intermediate coil assemblies are secured to the inner surface of the motor frame body 14 between the field pole assemblies 26.

An armature assembly generally designated by the numeral 52 and illustrated in FIG. 1 includes the shaft 40 on which a plurality of coils 54 are supported and a commutator 56 to which the respective coils are connected.

Figure 8:
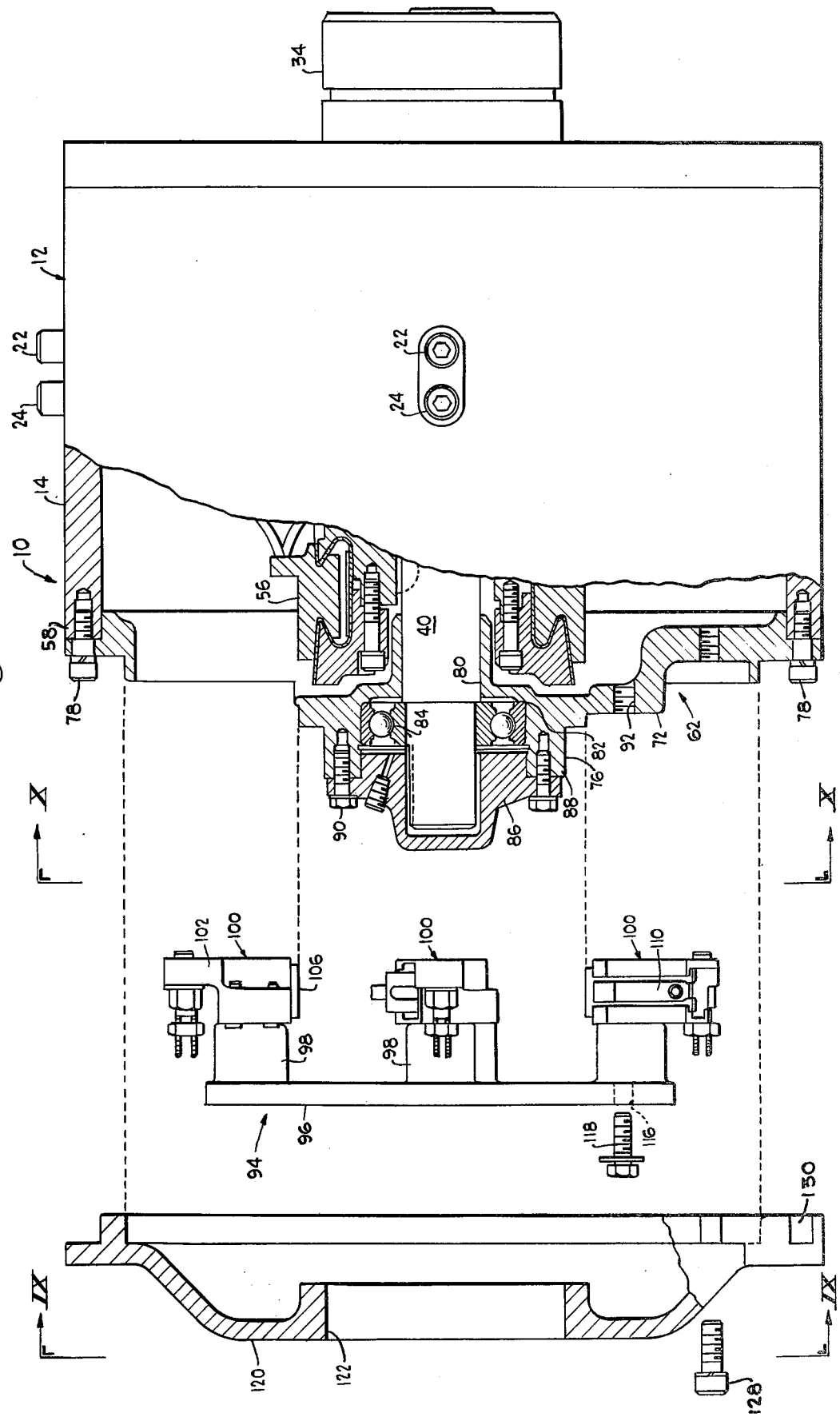
FIG. 8 is an exploded view of the improved reversible motor illustrated in FIG. 1 with the armature supported on the internal end frame bracket with the brush holder and the end bell removed therefrom.

The motor frame body portion 14 has an annular end portion 58 with a plurality of longitudinal threaded bolt receiving bores 60 therein. An internal end frame bracket generally designated by the numeral 62 and illustrated in detail in FIG. 10 has an annular outer ring portion 64 with a plurality of apertures 66 therein and four inwardly extending spokes 68, 70, 72 and 74 that connect the outer ring portion 64 to a shaft supporting hub portion 76. The spokes 68, 70, 72 and 74 are spaced from each other and provide access openings into the internal portion of the frame 14 for the brush assemblies as later discussed. As illustrated in FIG. 8, the spokes 68 – 74 have an inwardly offset portion to permit the hub 76 to extend outwardly from the motor frame body portion 14 when the internal end frame 62 is connected to the end portion 58 of the motor frame body 14 by means of bolts 78. The hub portion 76 has a bore 80 therethrough with an internal shoulder portion 82. A bearing 84 is positioned in the bore 80 in abutting relation with the shoulder 82 and is arranged to rotatably support the shaft 40 of armature assembly 52 in the end frame 62. A shaft cover 86 is secured to the annular end portion 88 of hub 76 by bolts 90 so that the armature assembly 52 is rotatably supported within the motor frame 12. The spokes 68, 70, 72 and 74 have threaded bores 92 therethrough arranged to receive and support a brush support ring generally designated by the numeral 94.

Figure 2:
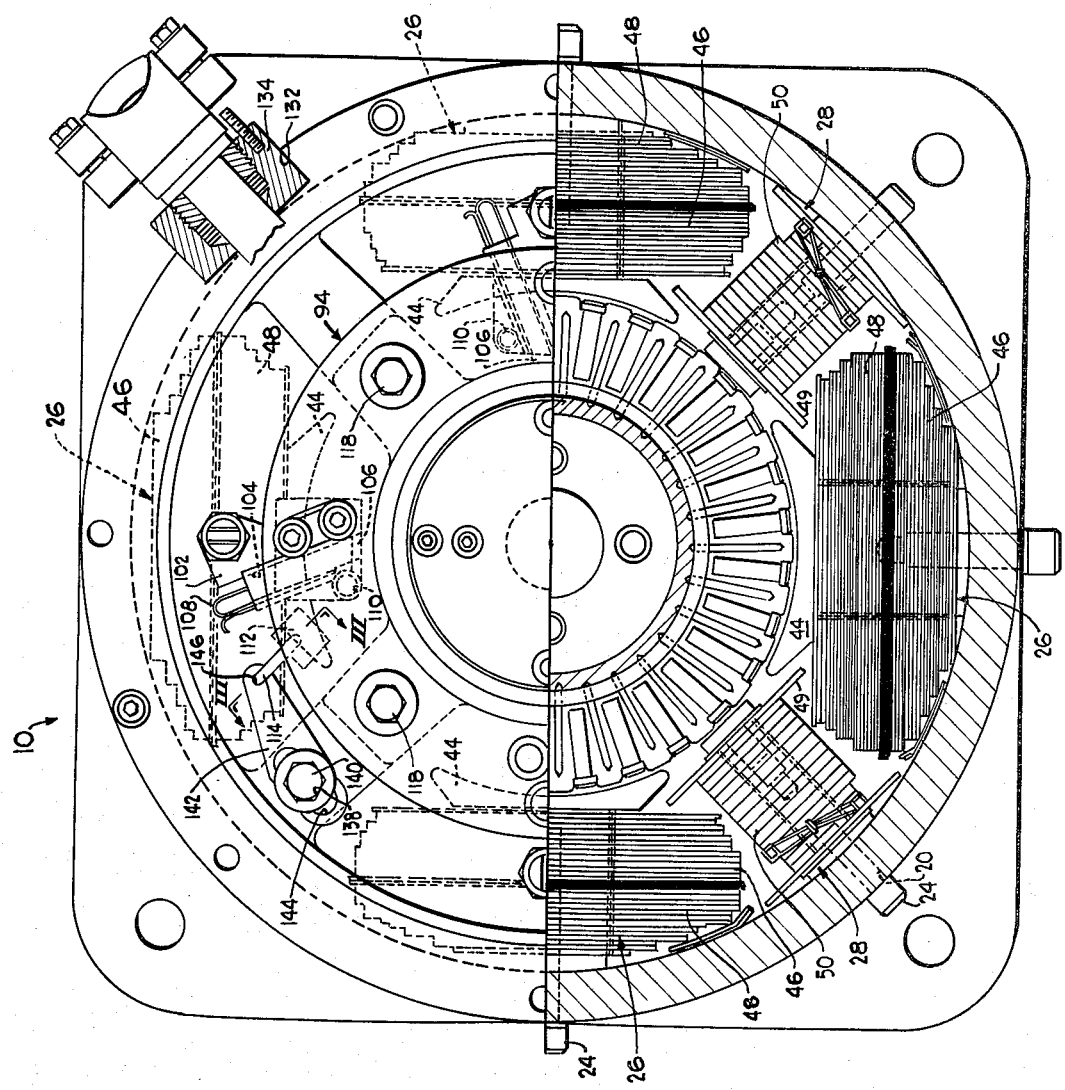
FIG. 2 is a view in section taken along the line II—II of FIG. 1, illustrating the inner portion of the electric motor with the end bell removed therefrom.

The brush support ring 94 is fabricated from a non-conducting material such as a fiber reinforced resin and has an annular ring portion 96 with four forwardly extending brush support members 98 on which brush assemblies 100 are secured. The brush assemblies 100 include, as illustrated in FIG. 2, a body portion 102 with a channel shaped slot 104. A carbon brush 106 is slidably positioned in the channel shaped slot and is urged downwardly against the commutator 56 by a metallic clip 108 connected to a constant tension spring 110.

The brush support ring 94 has an inwardly extending portion 112, illustrated in dotted lines in FIG. 2, with a pin member 114 connected thereto and extending forwardly therefrom. The annular ring portion 96 of brush support ring 94 has four arcuately slotted apertures 116 between the inwardly extending brush support members 98 and bolts 118, as illustrated in FIG. 8, to secure the brush ring to the spokes 68, 70, 72 and 74 of inner end frame 62 with the brush holders 100 extending into the inner portion of the motor frame 12 in overlying relation with the commutator 56.

Figure 9:
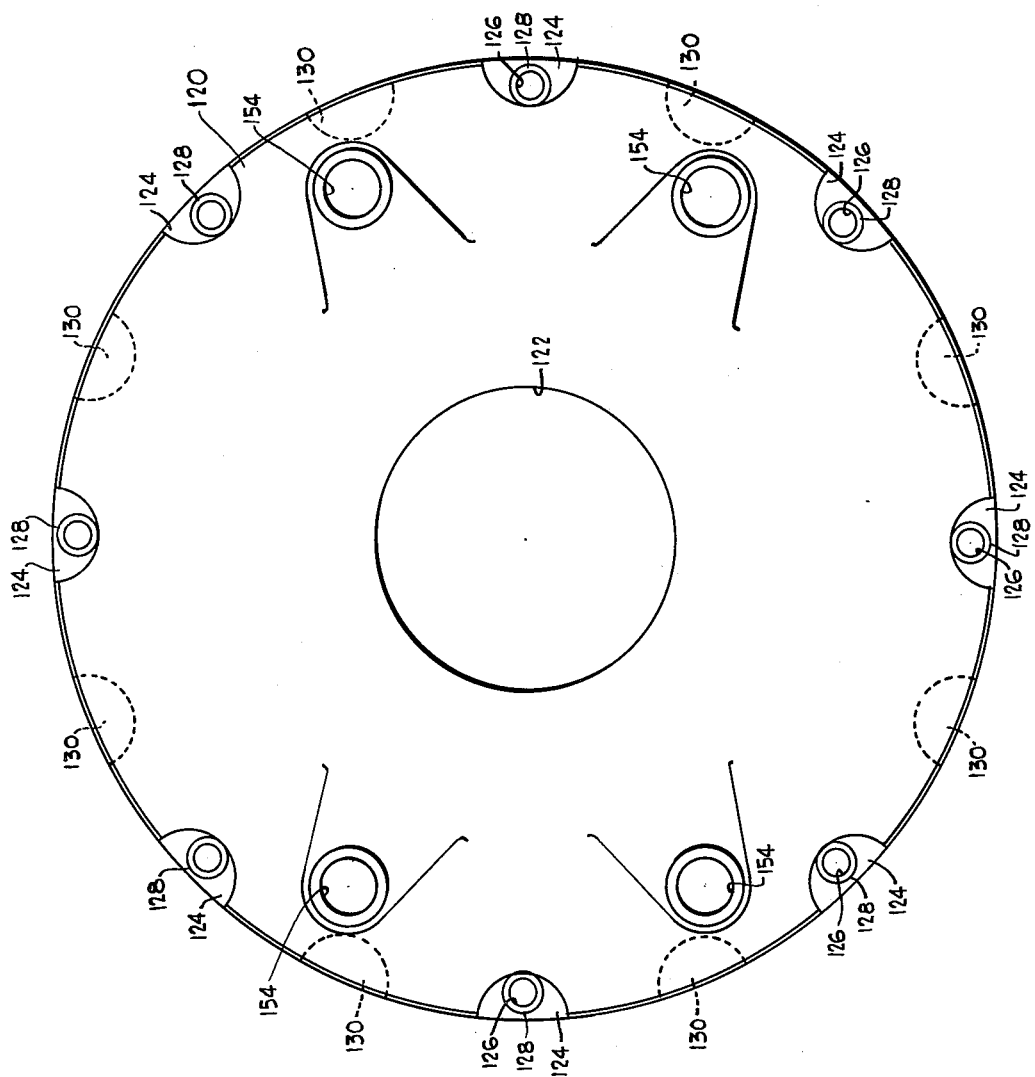
FIG. 9 is a view in end elevation taken along the line IX—IX of FIG. 8, illustrating the motor end bell.
Figure 10:
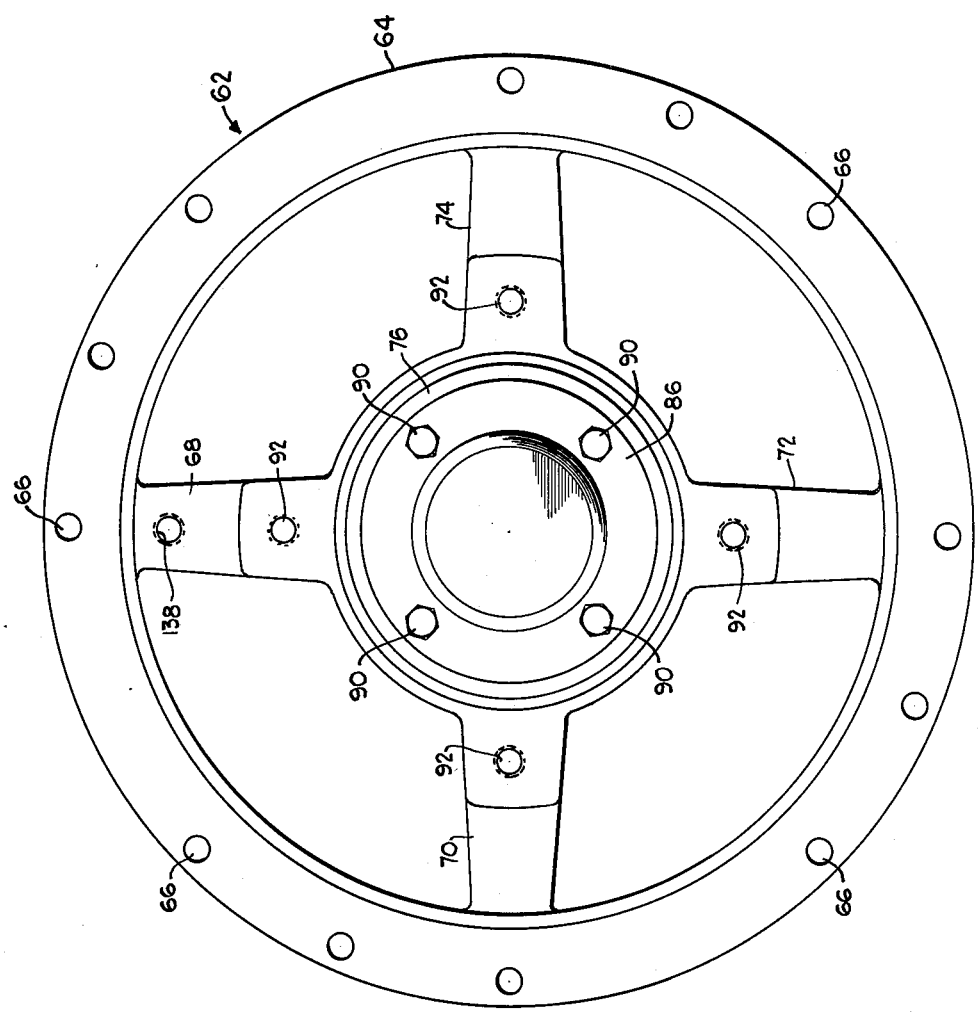
FIG. 10 is a view in side elevation taken along the line X—X of FIG. 8, illustrating in detail the internal end frame bracket that supports the armature.

An end bell 120, illustrated in detail in FIGS. 8 and 9, has a central bore 122 that is arranged to extend over the hub 76 of end frame 62. Around the peripheral edge of the end bell 120 there are a plurality of arcuate recessed portions 124 with longitudinal bores 126 therethrough to receive bolts 128 that are threadably secured in mating bores 60 in the frame body portion 14.

As illustrated in FIGS. 1 and 8, the end bell has recessed portions 130 that are positioned in overlying relation with the heads of bolts 78 securing the inner end frame 62 to the body portion 14. As illustrated in FIG. 1, the motor frame body portion 14 has a radial bore 132 with a plug member 134 therein. A three conductor cable 136 is suitably secured in the plug 134 with a packing gland therearound to provide current for the motor 10.

Figure 3:
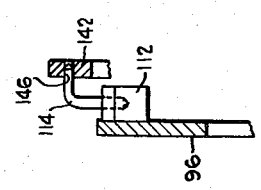
FIG. 3 is a view in section taken along the line III—III of FIG. 2, illustrating the indexing pin and bracket for maintaining the brush in a neutral position on the commutator.
Figure 6:
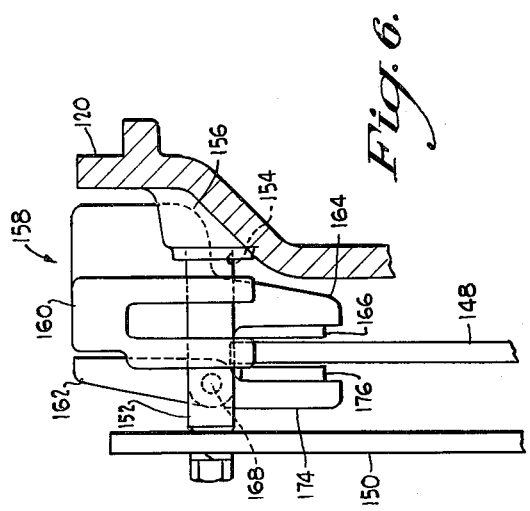
FIG. 6 is a fragmentary view in side elevation of the disc brake illustrated in FIGS. 4 and 5.

Referring to FIGS. 2 and 3, the end frame spoke 68 has a threaded bore 138 therethrough with a bolt 140 positioned therein. A bracket 142 has an elongated slotted aperture 144 and a pin receiving aperture 146. The bracket is positioned in abutting relation with the spoke 68 and the bolt extends through the elongated slot 144 to adjustably secure the bracket 142 to the spoke 68. As later discussed, the bracket and pin are arranged to maintain a neutral for the carbon brushes 106 on the commutator 56.

With the above described motor 10 it is possible to provide rotation for the output shaft 40 in either direction by energizing either coils 46 or 48. For example, when coils 46 are energized the shaft rotates in a clockwise direction. On the other hand, when coils 48 are energized the shaft 40 rotates in a counter-clockwise direction. It will be appreciated with this arrangement that the number of contactors, switches, solenoids and the like are substantially reduced in a vehicle where six motors are employed to provide traction for the six separate wheels in both forward and reverse direction.

Further, with the above described arrangement it is now possible to replace all of the brushes 106 without removing the armature 52 from the motor frame 12. Referring to FIG. 8, the end frame 62 is secured to the frame body portion 14 and rotatably supports the armature 52 with the motor frame 12. The brush support ring 94 is positioned in overlying relation with the end frame 62 and is secured thereto by bolts 118 extending into threaded apertures 92. With the brush supports 98 extending into the inner portion of frame body portion 14 between the respective spokes 68, 70, 72 and 74 the brushes 106 are in contact with the commutator 56 as illustrated in FIG. 1. The end bell 120 is positioned in overlying relation with the end frame 62 and encloses the brush holder support ring 94 and the inner end frame 62.

To remove and replace the brushes 106 the end bell 120 is first removed, as illustrated in FIG. 8, by removing bolts 128 (FIG. 9) and thereafter bolts 118 are removed and support ring 96 with the brushes 106 supported thereon is removed from the inner portion of the motor housing 12 while the end portion of armature 52 remains rotatably supported in the inner end frame 62. All four brushes 106 can be quickly removed and replaced and the motor quickly reassembled without moving and disturbing the mounting frame 12 on the vehicle. The brush support ring 94 is then again positioned in abutting relation with the inner end frame 62 with the brush supports 98 extending through the space between the spokes 68 – 74 and the newly replaced brushes 106 are again in abutting relation with the commutator 56.

In order to position and maintain the brushes at a neutral point on the commutator 56 the pin member 114 on the brush support ring is positioned in the aperture 146 and bracket 142 secured to end frame spoke 68. The neutral point both in the forward and reverse direction is determined by positioning the motor on a test stand and the motor is energized and placed under load. The brush support ring 94 is then rotated relative to the inner end frame 62 with the pin 114 in aperture 146 of bracket 142 until minimum sparking between the brushes and commutator is observed. Thereafter, the bolt 140 is tightened to fixedly position the bracket 142 and the bracket 142 with pin receiving aperture 146 is maintained in this fixed position. After the brush support ring is removed for brush replacement it is repositioned as above discussed with the guide pin 114 in pin receiving aperture 146 and the brushes 106 are automatically positioned at neutral where sparking is at a minimum. The brushes 106 can thus be all quickly and efficiently removed and replaced without removing and/or disturbing the armature 52 or the neutral relation of the brushes on the commutator.

Referring to FIGS. 4, 5, 6 and 7, there is illustrated a braking mechanism for use with the above described reversible motor. The disc brake is preferably attached to the end portion of the shaft 40 which is enclosed by the shaft cover 86. The brake disc 148 is nonrotatably secured and axially fixed to the shaft 40 in any suitable manner and a grid or protective screen 150 is secured to the end bell 120 by pins 152 secured in bores 154 of the protuberances 156 extending outwardly from the end bell 120. The disc brake generally designated by the numeral 158 is also supported on a pair of pins 152 and has a body portion 160 and a pivoted actuator portion 162. The body portion 160 has a depending arm 164 with brake pads 166 thereon that are fabricated from a suitable lining material. The pads 166 are fixedly positioned on the brake body portion depending arm 164 adjacent the surface of the brake disc 148. The actuator portion 162 is pivotally connected to the body portion 160 by means of a transversely extending pin 168 extending through transverse bores 170 in the actuator 162 and aligned end bores 172 in the body portion 160. The pivoted actuator portion 162 has a depending arm portion 174 with brake pads 176 positioned adjacent the other surface of the disc 148.

Figure 7:
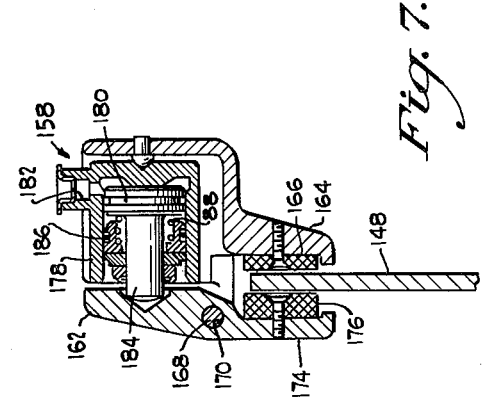
FIG. 7 is a view in section taken along the line VII—VII of FIG. 7, illustrating the actuating mechanism for the disc brake illustrated in FIGS. 4 – 6.
Figure 4:
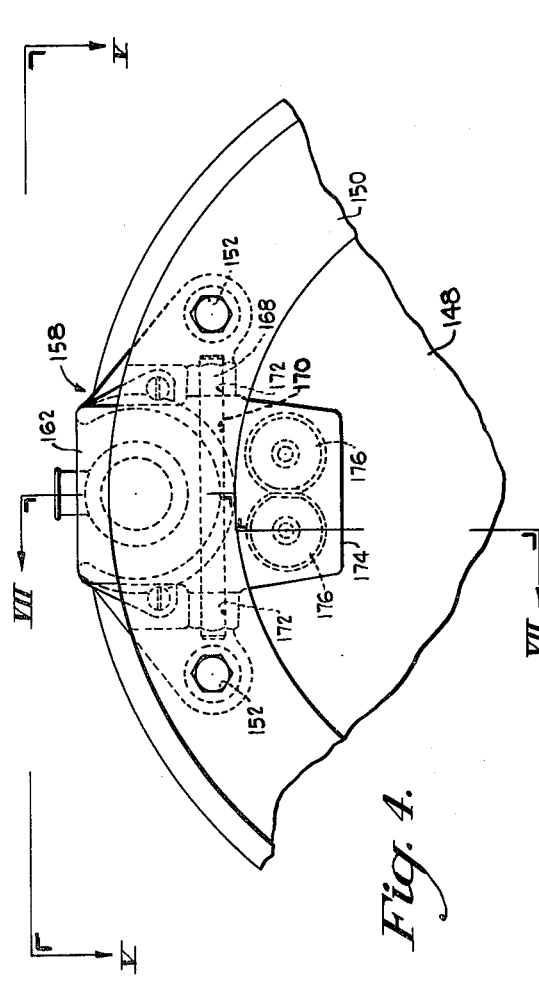
FIG. 4 is a fragmentary view in elevation of the disc brake mounted on the improved electric motor.
Figure 5:
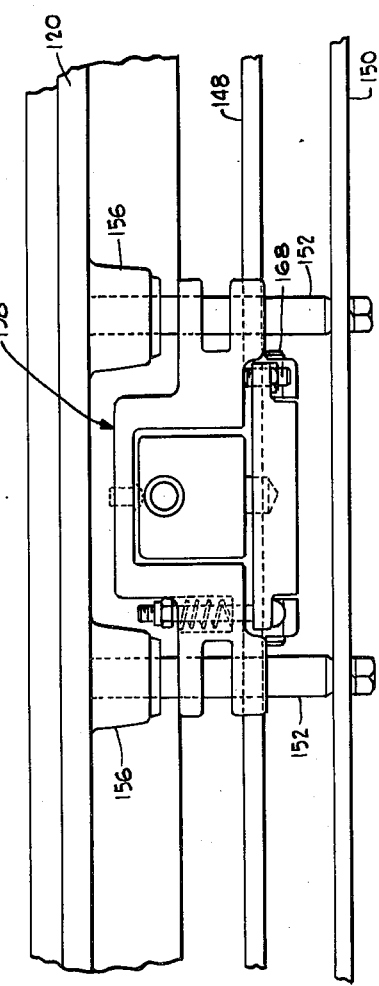
FIG. 5 is a top plan view taken along the line V—V of FIG. 4.

Within the body portion 160 there is positioned an actuator, illustrated in detail in FIG. 7, that includes a cylinder 178 with a piston 180 positioned therein. The cylinder 178 has an opening 182 arranged to supply fluid under pressure to the cylinder 178 at a location behind the piston 180. The piston 180 has a rod member 184 that extends through a suitable seal 186 into abutting relation with the pivoted actuator portion 162 above the pin 168. A resilient spring 188 within the cylinder 178 urges the piston 180 away from the actuator 162 so that the brake remains actuated only when positive fluid pressure is applied to the piston 180. With the above arrangement fluid under pressure supplied through opening 182 moves the piston 180 and pivots the actuator 162 about the pin 168 to urge the brake pads 176 against one surface of the brake disc 148 and further fluid pressure moves the body portion on pins 152 to bring the brake pads 166 on the body portion 160 into abutting relation with the other surface of the brake disc 148. Thus, with the above arrangement a disc type brake may be positioned on the electric motor 10 to provide accurate and positive braking for the electric motor and the traction wheels of the haulage vehicle connected thereto.

Referring to FIG. 11, which is a circuit diagram for the electric motor 10, there is schematically illustrated a conductor 190 having three wires 192, 194 and 196 connected to a source of DC current through a pair of contactors or switches (not shown). The wire 196 is connected to the field coils 46 and the wire 194 is connected to the other field coils 48. Wire 192 is connected to a pair of opposed brushes 106. The intercoils 28 are connected to the other pair of opposed brushes 106 in series by wire 198 and to a terminal of field coil 48 as illustrated.

With the above arrangement, the field coils are connected in series and are arranged, when coils 46 are energized, to rotate the motor in a first direction and when field coils 48 are energized, in the opposite direction.

According to the provisions of the patent statutes, I have explained the principle, preferred construction, and mode of operation of my invention, and have illustrated and described what I now consider to be its best embodiments. However, I desire to have it understood that, within the scope of the appended claims, the invention may be practiced otherwise than as specifically illustrated and described.

I claim:

1. An electric motor comprising,
   a motor frame having a cylindrical body portion with an annular open end portion and a closed end portion,
   an internal end plate secured to said motor frame annular open end portion,
   an armature shaft rotatably supported by said internal end plate within said motor frame body portion,
   an armature positioned on said shaft with a commutator portion adjacent to said internal end plate,
   said internal end plate having a plurality of openings therein,
   a brush support ring having a plurality of brush members thereon,
   said brush support ring secured to said motor frame in overlying relation to said internal end plate with said brush members extending through said openings in said internal end plate and in abutting relation with said commutator,
   said brush support ring with said brush members thereon arranged to be removed from said motor frame while said armature shaft remains rotatably supported by said internal end plate, and
   indexing means on said motor frame to position said brushes on said commutator in a neutral position.

2. An electric motor as set forth in claim 1 in which said indexing means includes,
   a pin member secured to said brush ring and extending therefrom,
   a receiver on said internal end plate for said pin member, said receiver being adjustable radially to position said brushes on said brush support member at a neutral position on said commutator.

3. An electric motor comprising,
   a motor frame having a cylindrical body portion with an annular open end portion and a closed end portion,
   an internal end plate secured to said motor frame annular open end portion,
   said internal end plate including an outer annular ring portion, a central hub portion and a plurality of spokes extending radially from said hub portion to said outer ring portion, said spokes being spaced from each other to provide openings in said internal end plate for said brush members on said brush support ring,
   an armature shaft rotatably supported by said internal end plate within said motor frame body portion,
   an armature positioned on said shaft with a commutator portion adjacent to said internal end plate,
   a brush support ring having a plurality of brush members thereon,
   said brush support ring secured to said motor frame in overlying relation to said internal end plate with said brush members extending through said openings in said internal end plate and in abutting relation with said commutator, and
   said brush support ring with said brush members thereon arranged to be removed from said motor frame while said armature shaft remains rotatably supported by said internal end plate.

4. An electric motor comprising,
   a motor frame having a cylindrical body portion with an annular open end portion and a closed end portion,
   an internal end plate secured to said motor frame annular open end portion,
   an armature shaft rotatably supported by said internal end plate within said motor frame body portion,
   an armature positioned on said shaft with a commutator portion adjacent to said internal end plate,
   said internal end plate having a plurality of openings therein,
   a brush support ring having an annular ring portion with a face portion,
   a plurality of brush supports extending forwardly from said face portion in spaced relation to each other,
   brush assemblies secured to said brush supports,
   said brush support ring secured to said motor frame in overlying relation with said internal end plate with said brush assemblies extending through said openings in said internal end plate and in abutting relation with said commutator, and
   said plurality of openings in said internal end plate providing access means for removal of said brush assemblies from said motor frame while said armature shaft remains rotatably supported by said internal end plate.

5. A reversible direct current electric motor comprising,
   a motor housing,
   an armature rotatably mounted in said housing,
   four field pole assemblies secured to said motor housing and extending inwardly toward said armature,
   each of said field pole assemblies having a first field coil wound thereon in a first direction,
   each of said field pole assemblies having a second field coil wound thereon in a second direction opposite to said first direction,
   a pair of said field pole assemblies having said first field coil positioned adjacent to said motor housing and the other pair of said field pole assemblies having said second field coil positioned adjacent to said motor housing,
   said first field coils connected to each other in series so that upon energization of said first field coils said armature rotates in a first direction, and
   said second field coils connected to each other in series so that upon energization of said second field coils said armature rotates in a second opposite direction.

* * * * *